May 14, 1935.  W. R. GRISWOLD  2,001,020
MOTOR MOUNTING
Filed Nov. 20, 1931
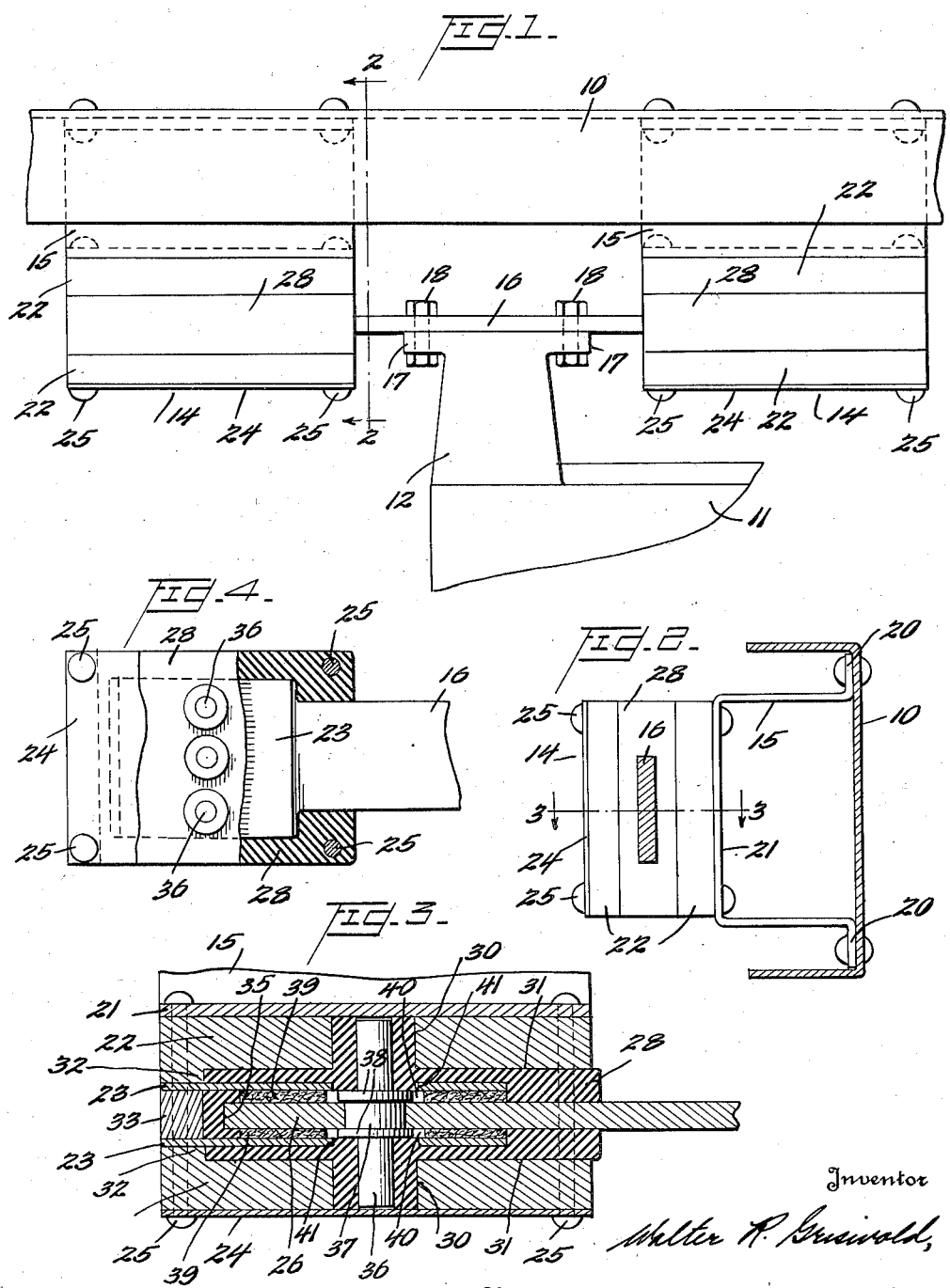

Patented May 14, 1935

2,001,020

UNITED STATES PATENT OFFICE 2,001,020

MOTOR MOUNTING

Walter R. Griswold, Detroit, Mich., assignor to Packard Motor Car Company, Detroit, Mich., a corporation of Michigan Application November 20, 1931, Serial No. 576,406

12 Claims. (Cl. 248—14.2)

This invention relates to mountings for engines and like devices which generate vibrations and has for its main object the provision of such mountings for damping and cushioning the vibrations whereby their effect on the foundation or other support is materially reduced.

It is a general object of the present invention to provide a novel and improved mounting which serves to damp vibrations both by reason of internal friction in elastic material and rubbing friction.

An important feature of the invention resides in the provision of a mounting wherein sliding friction surfaces are completely protected so that their coefficients of friction remain constant, for instance, by being enclosed in elastic material.

Still another feature of the invention resides in the provision of mounting means for internal combustion engines for securing them to the frames of automotive vehicles, wherein a pair of vibration damping mountings jointly support a rigid member substantially parallel to the axis of the engine to which is secured one of the engine arms.

Other and further features and objects of the invention will be more apparent to those skilled in the art from a consideration of the accompanying drawing and following specification, wherein is disclosed a single exemplary embodiment of the present invention, with the understanding, however, that various changes and modifications may be made therein such as fall within the scope of the appended claims without departing from the spirit of the invention.

In said drawing:

Figure 1 is a plan view of a portion of a vehicle chassis frame and one motor arm showing vibration damping mountings constructed according to the present invention forming the connecting means between them;

Figure 2 is a transverse section taken on line 2—2 of Fig. 1;

Figure 3 is a horizontal section taken on line 3—3 of Fig. 2; and

Figure 4 is a side elevation of one of the vibration damping mountings showing parts successively broken away to illustrate the interior construction.

It has long been realized that some effective means is desirable for limiting the amount of vibration transferred between any machine or mechanism which, for the sake of convenience, may be termed a "vibration generator", and its foundation or other supporting means. The present invention contemplates improved means for this purpose which has been illustrated for the sake of convenience in the form of a mounting for an internal combustion engine for automotive vehicles, but it will be understood that it can apply with equal facility to other mechanisms and it is the intent of this invention to cover the use broadly while disclosing the invention in its more restricted form.

If an attempt is made to mount an internal combustion engine by means of flexible mountings such as rubber, steel springs or the like to the chassis frame, it is found that the flexibility thus imparted to the moving body, i. e. the motor mass, is such that the vibration of this mass is augmented even though it may not be transmitted unduly to the vehicle, although as the amplitude of vibration of the mass increases the flexible material becomes less effective for absorbing the energy of vibration and eventually the chassis is seriously affected.

In accordance with the present invention, the engine is mounted by means of elastic material but in addition to this, parts having sliding friction are arranged for cooperation to damp out any tendency for increase in amplitude of the vibrations. In this way the amount of vibration of the engine mass is maintained within reasonable limits and the hysteresis loading of the elastic material is reduced. The final result is apparent in the added smoothness of the resultant assembly produced by the combination of the sliding friction, the elastic mounting and the hysteresis losses in the elastic material.

Referring now to the drawing, there is disclosed at 10 one of the side frame members of a vehicle chassis, for instance, the customary channel beam. The motor is shown at 11 having integral therewith or secured thereto in any customary manner the supporting arm 12. Between the chassis frame and the motor arm is arranged the mounting assembly comprising, in the present instance, two vibration dampers 14 of identical construction, each secured by means of a bracket 15 to the chassis frame 10, and a connecting bar 16 to which flanges 17 on the motor arm are secured by bolts 18 or other suitable fastening means.

As previously stated, the actual vibration damping devices or supports are identical in construction and a description of one will suffice for both. The bracket 15 which supports each vibration damper is in the form of a U of rigid metal plate having the feet 20 riveted as shown to the web of the channel member of the chassis frame.

Attached to the flat portion 21 of this bracket 15 is the portion of the mounting assembly which is rigid therewith and includes the two frame plates 22 of identical construction which are spaced apart and face each other, the friction plates 23 and the cover plate 24. These parts are secured together and attached to the bracket by the four corner rivets 25, two of which pass through all of them and two of which are beyond the ends of the friction plates. The rivets are shown as in the corners, but it is evident that the device need not be rectangular and that the rivets in any case would be near the periphery.

In the remainder of this description it will be assumed that the chassis and mounting parts attached thereto are the stationary portions and that the parts attached to the motor are movable in respect thereto. According to this designation the movable portion of the assembly is the bar 16 to which the motor arm is secured, the enlarged head 26 thereof which extends between the frame plates 22 and the friction plates 23 as clearly seen in Figure 3 and is spaced from each of them.

The mounting includes, in addition to the stationary assembly and the moving assembly, the elastic connecting medium generally designated by the reference character 28 and substantially filling the space between the various stationary parts and the movable part whereby an elastic connection is provided for supporting one from the other.

The stationary assembly is preferably constructed as follows. The frame plates 22 are each provided with a plurality of perforations 30 passing clear through them. In the present instance three of these are arranged in vertical alignment in each plate and those in the two plates are coaxial. The frame plates have the flat facing surfaces 31 and by virtue of the ribs 32 on the left ends thereof these surfaces 31 are spaced from the outer surfaces of the friction plates 23 which are respectively clamped between their corresponding frame plate and the spacing block 33, which thus causes the assembly to be properly spaced and held by the rivets at the left-hand end.

The substantially rectangular head 26 on the supporting bar 16 is less in vertical height than the height of the frame plates and is less in horizontal length than these frame plates, its left-hand end 35 being spaced from the spacing block 33, as seen in Figure 3. Its thickness is such that it is spaced from the inner faces of the friction plates. This head is provided with a plurality of transverse studs 36 equal in number and correspondingly positioned to the holes 30 in the frame plates. The studs are of such length that their ends are substantially flush with the outer faces of the frame plates. The diameter is such as to provide a large clearance between them and the walls of the holes 30. Preferably the portions 37 of the studs passing through the head 26 are of enlarged diameter and there are heads 38 swaged over the part 26 to retain the studs rigidly therein.

Between the two flat faces of the head 26 of the bar 16 and the inner faces of the friction plates 23 are the friction elements 39 tightly fitting therein. These are preferably rectangular sheets of suitable friction material such, for instance, as vulcanized fiber, brake lining material or the like, having a coefficient of friction sufficient for the purpose and the characteristic of non-squeaking. They are provided with enlarged central openings 40 which have large clearance around the heads 38 to permit movement of these heads without imparting this movement to the friction elements. It should be borne in mind that the friction plates 23 have openings 41 therein providing clearances around the studs 36 so that movement of the bar 16 and its head 26 is permitted in a vertical plane but resisted by the friction between the cooperating faces of the friction plates 23, the outer faces of the head 26 and the interposed friction elements 39.

All of the space remaining between the studs 36 and the walls of the holes 30; between the faces 31 of the frame plates and the bar and its head 26; between the friction plates and the frame plates and between the end of the head 26 and the spacer bar 33, is filled with a suitable elastic medium. While various substances would be satisfactory for this purpose, an excellent grade of rubber is preferred which has sufficient elasticity and strength to support the weight of the engine between the studs 36 and the lower portions of the walls of the holes in which they fit, and also by the adhesion between this material and the various faces of the stationary and movable parts. When rubber is used it can be adequately vulcanized to all of these faces with an adhesion greater than the tensile strength of the rubber. A large part of the rubber is in shear owing to the tendency of the head 26 to move downwardly under the weight of the engine and other parts of the rubber, particularly those beneath the studs are in compression.

As clearly seen in Figures 3 and 4, the rubber engages the outer periphery of the friction elements 39 holding them substantially in position and maintaining their clearance with the heads 38 on the studs so that they can be considered to float between the head 26 and the friction plates 23. It will also be seen that the rubber completely envelopes all of the friction parts and isolates their surfaces, maintaining them in such condition that their coefficient of friction is substantially constant, by excluding the atmosphere which, with its changes in humidity, temperature and the like, would seriously affect the friction surfaces and change them to such an extent that the operation of the device would not be uniform. However, by completely encasing the friction surfaces the results attained are such that there is but slight variation in the operation of the device in spite of wide changes in atmospheric conditions.

It will be appreciated that the device illustrated is by way of example only and that the friction surfaces can be provided in any desired manner so long as they are maintained within an envelope of elastic material which completely isolates them from the atmosphere. The elastic material thus plays three parts. First, it provides the elastic support for the engine. Second, it produces a certain amount of damping due to its inherent internal friction or hysteresis, and third, it provides adequate protection for the friction surfaces.

It will be appreciated that the average vehicle engine has a major component of vibration in a certain direction, usually vertically, and therefore the device is so arranged that the direction of this component is parallel to the planes of the surfaces of the head 26, the frame plates and the friction plates, whereby maximum damping of this component is effected.

The mounting is shown as supporting one corner of the engine on an assembly of two vibration dampers, but one can easily be used at each corner or any desired corner and other forms of mounting for other corners if found desirable.

Having thus described the invention, what is claimed as new and desired to be secured by Letters Patent is:

1. In a mounting for securing a vibration generator to a base, in combination, cooperating friction elements rigidly secured to each of said parts, elastic material separating said parts and adapted to be deformed by relative movement thereof, said elastic material surrounding said friction elements.

2. In a mounting for securing a vibration generator to a base, in combination, cooperating friction elements regidly secured to each of said parts, elastic material separating said parts and adapted to be deformed by relative movement thereof, said elastic material completely surrounding the engaging parts of said friction elements to exclude the atmosphere therefrom.

3. In a mounting for securing a vibration generator to a base, in combination, friction elements rigidly secured to each of said parts and engaging for relative sliding movement in the direction of the vibrations, elastic material resisting such relative movement and deformed by it, said material enclosing said friction elements.

4. In a mounting for securing a vibration generator to a base, in combination, a part secured to said generator, a part secured to said base, an elastically deformable element connecting said parts and serving to resist relative movement thereof, means whereby said element is subjected to both shear and compression stresses on relative movement of said parts and means enclosed within said deformable element and associated with each of said parts for frictionally retarding relative movement thereof.

5. A mounting for securing an internal combustion engine to a chassis frame comprising, in combination, a casing secured to one of said parts, a plate secured to the other part and passing into said casing, means within the casing connecting said casing and plate for frictional retardation of relative movement and an elastically deformable element filling the space between said casing and plate secured to both and surrounding the friction means.

6. A mounting for securing an internal combustion engine to a chassis frame comprising, in combination, a casing secured to one of said parts, a plate secured to the other part and passing into said casing, means within the casing connecting said casing and plate for frictional retardation of relative movement, an elastically deformable element filling the space between said casing and plate and secured to both for shearing stress on relative movement, and surfaces on the casing and plate extending laterally of the direction of relative movement, said element extending between said surfaces for compressive stress on relative movement of the casing and plate and completely encasing the friction means.

7. A mounting for securing an internal combustion engine to a chassis frame comprising, in combination, a casing secured to one of said parts and having a pair of spaced parallel members, a plate secured to the other part and passing between said members, a friction element engaging said plate and casing to retard relative movement therebetween, and rubber vulcanized to the said members and plate and forming an elastically deformable connection therebetween, said rubber serving to maintain said friction element in position.

8. A mounting for securing an internal combustion engine to a chassis frame comprising, in combination, a casing secured to one of said parts and having a pair of spaced parallel members, a plate secured to the other part and passing between said members, a friction element engaging said plate and casing to retard relative movement therebetween, and rubber vulcanized to the said members and plate and forming an elastically deformable connection therebetween, said plate having a laterally extending stud thereon projecting into a larger hole in one of said members, said rubber filling the space between said stud and the walls of the hole.

9. A mounting for securing an internal combustion engine to a chassis frame comprising in combination, a main plate adapted to be secured to one of said parts, a member adapted to be secured to the other part and having a pair of webs each spaced from one side of the main plate, a pair of friction plates carried by said member and disposed on either side of said main plate, a floating friction element between each friction plate and the main plate and a rubber damping member deformably mounted between the main plate and the webs and enclosing the friction elements.

10. A mounting for securing an internal combustion engine to a chassis frame comprising, in combination, a main plate adapted to be secured to one of said parts, a member adapted to be secured to the other part and having a pair of webs each spaced from one side of the main plate, a pair of friction plates carried by said member and disposed on either side of said main plate, a floating friction element between each friction plate and the main plate, a stud projecting laterally from each side of the main plate, the webs, friction plates and friction elements having holes to loosely receive said studs and a rubber damping member deformably mounted between the main plate and the webs, enclosing the friction elements and filling the spaces between the studs and the walls of said holes.

11. For use with an internal combustion engine having a supporting arm extending therefrom, a supporting element, a rubber block supporting the arm in said element and directly engaging both parts, and friction surfaces associated respectively with the arm and element and cooperating to provide frictional damping, said rubber block enclosing said surfaces.

12. In an internal combustion engine having a supporting leg extending therefrom, an arm secured transversely to the end of said leg, a pair of supporting elements, a rubber block supporting each end of said arm in one of said elements, engaging friction surfaces for one of said elements and the cooperating arm end, said surfaces functioning to provide friction damping and being enclosed in the rubber block.

WALTER R. GRISWOLD.